W. C. HATTENDORF.
CONVERTIBLE AUTOMOBILE BODY.
APPLICATION FILED JUNE 30, 1917.
1,269,929.
Patented June 18, 1918.
2 SHEETS—SHEET 1.
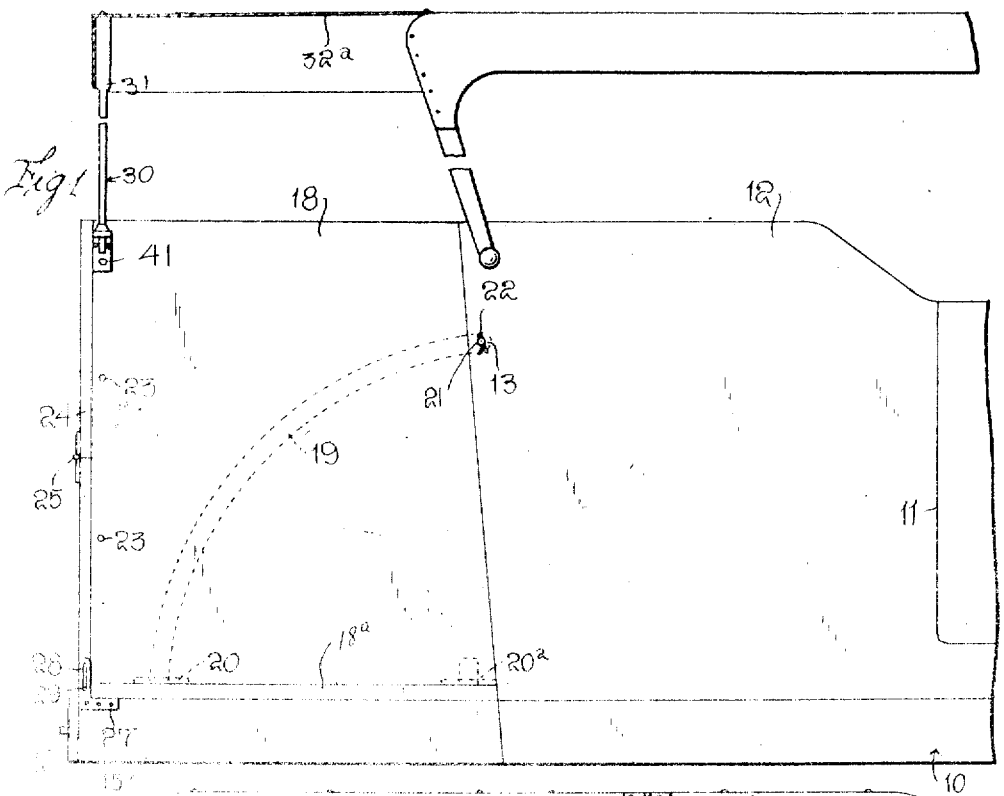
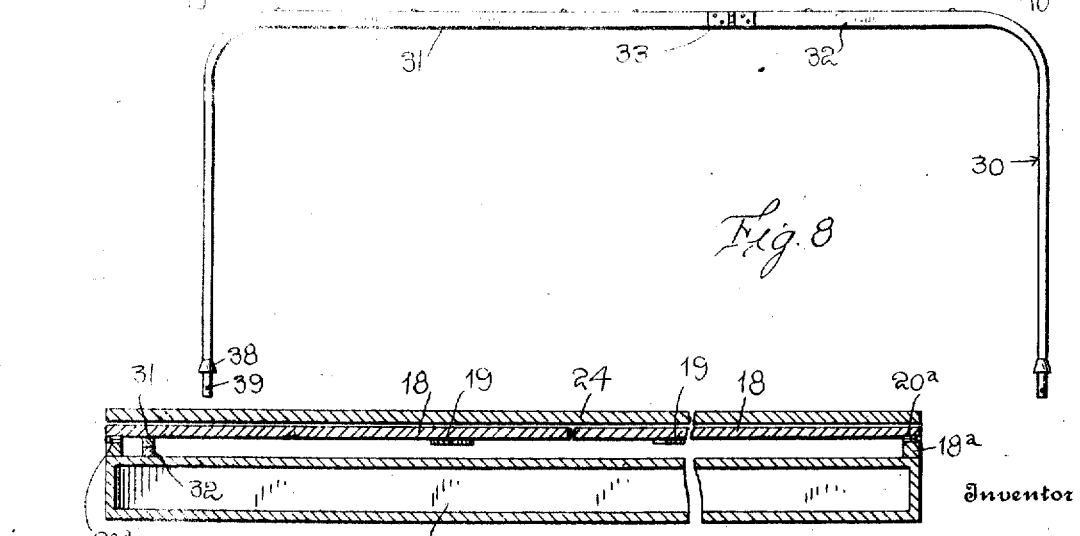
Inventor
W. C. HATTENDORF
By Watson E. Coleman
Attorney

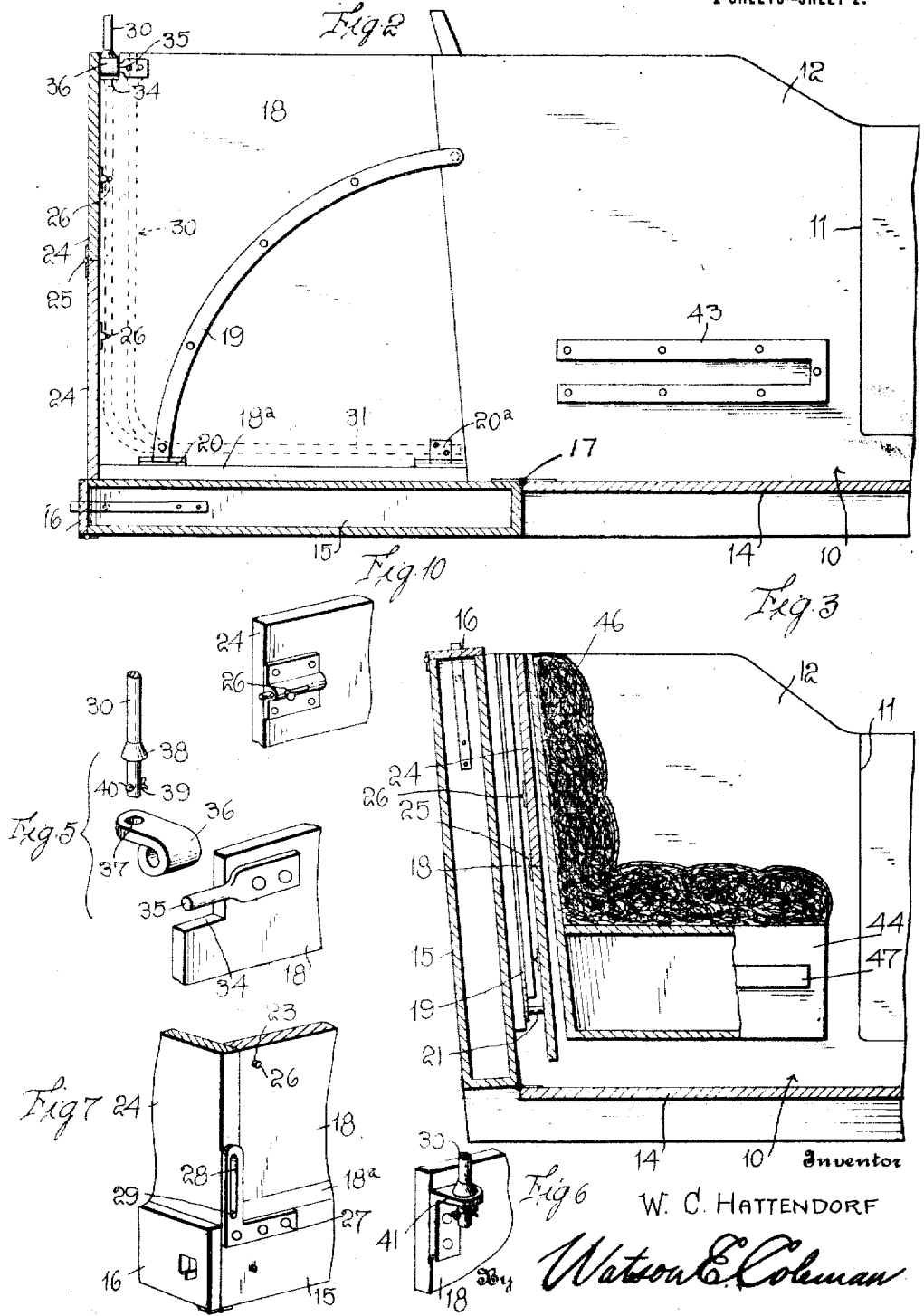

UNITED STATES PATENT OFFICE.

WILLIAM C. HATTENDORF, OF SCHAUMBURG TOWNSHIP, COOK COUNTY, ILLINOIS.

CONVERTIBLE AUTOMOBILE-BODY.

1,269,929.  Specification of Letters Patent.  Patented June 18, 1918.

Application filed June 30, 1917. Serial No. 177,899.

*To all whom it may concern:*

Be it known that I, WILLIAM C. HATTENDORF, a citizen of the United States, residing in the township of Schaumburg, in the county of Cook and State of Illinois, have invented certain new and useful Improvements in Convertible Automobile - Bodies, of which the following is a specification, reference being had to the accompanying drawings.

This invention relates to automobiles, and particularly to convertible bodies therefor, and the general object of the invention is to provide an automobile body which may be readily converted from a touring car body into a light delivery body.

A further object of the invention is to provide a rear section which, when shifted into one position, forms the rear end wall of the car and which, when shifted into another position, forms the bottom of an extension of the car, there being side walls pivoted to the sides of said convertible end wall so as to be turned up to form the sides of the extension body and there being also hinged to said end wall, an end gate, which may be turned up into a vertical position when the end wall is turned down to form the floor of the extension.

A further object is to provide means whereby an auxiliary top may be secured to the extension and provide means whereby an auxiliary bow may be secured to the side walls of the extension, this bow being formed so that it may be folded against said side walls of the extension when the extension is turned up to form the rear end of the body.

A further object is to so construct the end wall that it will form a receptacle for spare tires, inner tubes, etc.

Other objects are to improve the details of construction of devices of this character so that the various walls may be detachably engaged with each other to hold them firmly in position when folded or extended.

My invention is illustrated in the accompanying drawings, wherein:

Figure 1 is an elevation of a portion of an automobile body with my foldable extension disposed in its operative position;

Fig. 2 is a longitudinal sectional view of the construction illustrated in Fig. 1;

Fig. 3 is a longitudinal fragmentary sectional view of the rear end of the automobile body showing my extension folded up to form the back of the automobile body, and showing the rear seat in place;

Fig. 4 is a vertical transverse sectional view through the extension when folded;

Fig. 5 is a fragmentary perspective view showing the means for connecting the rear bow to one of the side walls 18;

Fig. 6 is a fragmentary perspective view showing the manner of connecting the other end of the rear bow to the other side wall 18;

Fig. 7 is a fragmentary perspective view showing the manner of connecting the end gate to the wall 15;

Fig. 8 is an inside elevation of the rear bow;

Fig. 9 is a fragmentary perspective view showing one of the braces 19 and the pin whereby the brace is connected to the side wall 12;

Fig. 10 is a perspective view of a portion of the end gate and one of the latch bolts.

Referring to these drawings, 10 designates the permanent body of the automobile, the side walls of which are provided with the rear door openings 11 and these side walls 12 at their rear upper corners are provided with perforations 13 for the purpose which will be later described.

Hinged to the bottom 14 of the body 10 is a member 15, which constitutes, when turned up, the end wall of the automobile body and which, when turned down, constitutes the floor of the delivery extension. This member 15 is preferably formed with a double wall, in other words, the member is hollow for the reception of spare tires, inner tubes, etc., and the outer end is closed by means of a lid 16. The wall 15 is hinged at 17 to the bottom 14 and the wall 15 has a width such that when the wall 15 is disposed in a vertical position, it will fit between the side walls 12 and the outer side of the wall 15 will bear against the side walls 12 to make a nice fit on the outside of the automobile body.

Hinged to the wall 15, on each side thereof, are the auxiliary side walls 18. Each of these side walls is provided on its inner face with a curved metallic strap 19, which extends from the outer forward corner of the side wall nearly to the opposite inner corner. This strap at its inner end is formed with a hinge knuckle 20 for connecting the side wall to the wall 15. The side wall 18 is also provided with a knuckle 20ª adjacent its forward inner corner, whereby it is connected to the bottom 15. These auxiliary side walls 18 are adapted to be folded over upon the wall 15, as illustrated in Fig. 4, or turned into angular relation thereto, as shown in Fig. 1. Each of these metallic straps 19, at its outer end, is provided with an inwardly extending pin 21 which, when the side wall 18 is turned to a vertical position, passes through the corresponding perforation 13. This pin on its outer end may be formed with an opening for a cotter pin 22, or any other suitable fastening means may be used to hold the pin in engagement with the perforation 13 in the side wall 12. It will be seen that inasmuch as these auxiliary side walls 18 are hinged strongly to the wall 15, that when this wall 15 is turned to a horizontal position, these strap irons 19 form braces holding the wall 15, which now forms the bottom of the extension, from depression and supporting this wall against any load which may be placed thereon.

The walls 18 adjacent their ends are formed with perforations 23 to receive the bolts of an end gate 24, which is hinged to the wall 15. The end gate 24 is preferably formed in two sections hingedly connected to each other, as at 25, and each of these sections is formed with laterally projectable bolts 26 engaging the perforations 23.

The lower section of the end gate 24 is hinged to the wall 15 by laterally disposed irons 27, these irons being angular in form and having shank portions attached to the lateral edge faces of the wall 15 and angularly disposed portions 28, which are longitudinally slotted. The end gate is formed with laterally projecting pins 29, which are disposed within the slots 28, so that the end gate may be lifted and turned in over the side walls 18, when these side walls in turn are turned over the wall 15, as illustrated in Fig. 4.

For the purpose of supporting a top upon the extension body, I provide an auxiliary bow designated generally 30, which bow is formed with two sections 31 and 32, hinged to each other at 33, so that the two sections may be folded over upon each other. The rear outer corner of one side wall is cut away as at 34 and attached to the inside face of this side wall is a pin 35, which projects across this cut-away portion. Rotatably mounted upon this pin is a clip 36, the shank of which is formed with a perforation 37 extending at right angles to the pin 35. The extremity of the section 31 of the bow is reduced and passes through this opening 37 and this reduced extremity is formed with a shoulder 38, which bears upon the top of the clip 36 and is also formed with an opening 39 for the passage of a cotter pin 40. The extension of the section 32 is connected to the other side wall by means of an angular iron 41 having a vertically disposed perforation through which the extremity of the bow passes, the extremity of the bow being formed with a perforation for the passage of a cotter pin. Thus the section 32 may be disconnected from the bracket or iron 41 so as to permit the section 32 to be folded over upon the section 31 and then the folded bow sections 31 and 32 may be turned downward into a position to lie against the inner face of the side wall which carries the clip 36, as illustrated in dotted lines in Fig. 2.

In the practical use of this invention, when the automobile is to be used for a touring car or other like purpose, the side walls 18 are turned inward against the member 15, the bow 30 being also folded over and turned inward and then the end gate 24 is lifted upward by reason of the slots 28 on the irons 27 and is folded inward upon the side walls of the bow. Then the member 15 is turned upward to a vertical position and operatively connected to the sides 12 so that the members 15, 18 and 24 together form the rear end of the automobile body. When it is desired to provide an extension for the automobile body, such as is used in delivery cars, the reverse operation occurs. In other words, the member 15 with its attached parts is turned outward, the side walls 18 are turned upward and connected to the side walls 12 by means of the pins 21, the end gate is turned upward and bolted in position by means of the bolts 26 and thus forms an extension of the automobile body.

It is to be understood that the side walls 12 are formed with slides 43 to receive the rear side supports 44, these side supports being provided with members which will engage with said slide, these rear side supports carrying a rear seat 46 and the tool box 47 and all the allied parts. Thus the whole rear seat with back rest, cushion, side upholstering and tool or cushion box may be set aside when it is desired to convert the body into a light delivery body and the rear seat, of course, is to be replaced when it is desired to convert the automobile into a five or seven passenger touring car. When the wall 15 has been turned to a vertical position, it will be seen that this hollow wall constitutes a vertically disposed receptacle for spare parts, such as spare tires, inner tubes, etc., and is closed by the lid 16. This lid may be held closed in any suitable manner.

It will be noted from Fig. 2 that the walls 18 are supported upon strips 18ª, so that a space is left when the walls 18 are turned downward, this space being adapted to receive the folded bow 30. The bow 32 is, of course, to carry a hood 32ª which may be connected to the rearmost bow on the automobile body, in the manner illustrated in Fig. 1, this hood thus forming an extension of the top. The side walls 12 of the automobile body extend beyond the bottom, as illustrated in Fig. 3, so that the member 15 will fold up within the side walls.

It will be seen that this construction permits an automobile to be readily converted, that no parts have to be added to or removed from the automobile body in order to secure such conversion, and that the conversion may be made very quickly. It will also be seen that by providing the bracing straps 19, that it is not necessary that the chassis of the automobile should extend rearward of the floor 10.

Having described my invention, what I claim is:—

1. A vehicle body having a floor and permanent side walls, and a rear extension comprising a bottom wall hinged to the floor of the body for movement from a vertical to a horizontal position, and auxiliary side walls hinged to the bottom wall to fold inward thereon, and supporting members on the inside faces of the auxiliary side walls for detachably connecting the auxiliary side walls to the permanent side walls, said means extending inward from the outer forward corner of the auxiliary side walls to the rear inner corner thereof and being attached to said side walls and acting to support the bottom, when the bottom is in a horizontal position.

2. A vehicle body having a floor and permanent side walls and a rear extension therefrom comprising a bottom wall hinged to the floor of the body and adapted to be turned into a vertical or a horizontal position, side walls hinged to the sides of said bottom wall to fold inward thereon, said side walls at their outer forward corners being provided with means for detachably engaging the permanent side walls, and an end gate hinged to the rear end of the bottom wall and adapted to be turned into a vertical position or be turned over upon the side walls when the latter are folded flat against the bottom wall, and means for detachably engaging the end gate with the auxiliary side walls.

3. A vehicle body having a floor and permanent side walls, and a rearward extension therefrom comprising a hollow bottom wall hinged to the floor of the body and open at its free end and adapted to contain spare parts, a lid for closing the open end of the hollow bottom, auxiliary side walls hinged to the bottom wall to fold inward thereon and having means at their outer forward corners for detachably engaging the upper rear corners of the permanent side walls, and an end gate hinged to the rear end of the bottom and adapted to be turned into a vertical position when the bottom is in a horizontal position or turned over upon the side walls, and means for holding said end gate in its operative position, said end gate being formed in two sections hinged to each other.

4. A vehicle body having a floor and permanent side walls, and a foldable extension comprising a bottom wall hingedly connected to the floor of the body adapted to be folded downward into parallel relation with the floor or to be turned to a vertical position, said extension further comprising sides foldable upon each other and upon the hinged bottom or adapted to be disposed in a vertical position to form extensions of the side walls of the body, and means for engaging said side walls with the side walls of the body and holding the side walls from lateral movement in either direction when so engaged.

5. A vehicle body having a floor and side walls, and a rearward extension comprising a bottom wall hinged to the floor of the body, auxiliary side walls hinged to the bottom wall to fold inward thereon and having links for detachably connecting them to the permanent side walls of the body, an auxiliary bow formed in foldable sections, one end of the bow being pivotally connected to one end of the auxiliary side walls, the other end of the bow being connected to the other side wall, and a top section mounted on said bow and adapted to be detachably connected to the top of the automobile.

6. A vehicle body having a floor and side walls and a rear extension for said bottom comprising a bottom wall hinged to the floor of the body and adapted to be folded into a horizontal or vertical position, side walls hinged to the bottom wall to fold inward thereon, the side walls being provided with means for detachably connecting said side walls to the permanent side walls of the body to thereby support the bottom, and an end gate hinged to said bottom and having limited vertical movement with relation to the bottom whereby said end gate may be folded over upon the side walls when the latter are folded over upon the bottom.

7. A vehicle body having a floor and side walls and a rear extension for said body comprising a bottom wall hinged to the floor of the body, and side walls hinged to the body to fold inward thereon, the inside faces of the side walls being provided with members projecting beyond the inside edges of the side walls, said members having laterally projecting pins, said permanent side walls of the body being formed with perforations into which said pins project.

In testimony whereof I hereunto affix my signature in the presence of two witnesses.

WILLIAM C. HATTENDORF.

Witnesses:
A. F. POTTRATZ,
GEO. H. GOEDDEKE.